(12) United States Patent
Pendleton et al.

(10) Patent No.: US 7,885,836 B2
(45) Date of Patent: Feb. 8, 2011

(54) INTEGRATED PAYMENT SYSTEM AND METHOD OF USING SAME

(75) Inventors: Keith Pendleton, Kempton, PA (US); David Andrew Klein, Hatboro, PA (US)

(73) Assignee: Advanced Provider Solutions, LLC, Huntingdon Valley, PA (US)

( * ) Notice: Subject to any disclaimer, the term of this patent is extended or adjusted under 35 U.S.C. 154(b) by 474 days.

(21) Appl. No.: 12/152,012

(22) Filed: May 12, 2008

(65) Prior Publication Data

US 2009/0281827 A1    Nov. 12, 2009

(51) Int. Cl.
*G06Q 40/00* (2006.01)
(52) U.S. Cl. .......................................... 705/4
(58) Field of Classification Search .................. 705/2–4
See application file for complete search history.

(56) References Cited

U.S. PATENT DOCUMENTS

2003/0195773 A1* 10/2003 Mahaffey ....................... 705/3
2005/0108067 A1* 5/2005 Chapman et al. ............... 705/4
2007/0198407 A1* 8/2007 Winter ......................... 705/40

* cited by examiner

*Primary Examiner*—Luke Gilligan
*Assistant Examiner*—Joseph Burgess
(74) *Attorney, Agent, or Firm*—Riverside Law, LLP

(57) ABSTRACT

An integrated payment system directed to the care of a subject and method of same is described herein. This system and method includes a care planner for accurately approximating the costs for the subject during the course of care, an insurance verifier and estimator that identifies the portion of the costs for the subject that is covered by the subjects insurance, wherein the approximated costs less the covered insurance leaves a subject payment, a discount planner that evaluates the application of at least one discount to the subject payment, and a payment planner that enables a payment arrangement for the subject for the subject payment less any applied discounts. Increased functionality of the payment system is achieved using automated integration of the care planner, the insurance verifier and estimator, the discount planner and the payment planner and providing the ability communicating in and among at least two of the care planner, the insurance verifier and estimator, the discount planner and the payment planner.

27 Claims, 5 Drawing Sheets

100

- 110 Care Planner
- 120 Insurance Verifier
- 130 Insurance Estimator
- 140 Discount Planner
- 150 Payment Planner

Figure 1

INTEGRATED PAYMENT SYSTEM AND METHOD OF USING SAME

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION a. Field of the Invention

The instant invention relates to the field of payment systems, and in particular to payment systems for maximizing collections, compliance and peace of mind.

b. Description of Related Art

Traditionally, there have been two major types of software used by providers' offices—billing software and electronic medical records software (EMR). Billing Software helps providers submit their charges to Health Insurance Plans/Payers and collect the insurance-portion-due. EMR systems enable providers to document their decision-making, treatment and prescriptions, for example, in electronic form. Billing Software has at least one deficiency in that there is no software that is able to facilitate payment from the patient of the patient-portion-due, the so called "self-pay component".

For the past several years, the Federal Government has been releasing specifications for paving the Health Care Information Superhighway. For an example of this, see www.hitsp.org. Additionally, major companies and governmental entities everywhere are combining forces to develop the organizational pillars of the Superhighway, based on the HITSP specifications, known as the Regional Health Information Organizations (RHIOs). RHIOs may be thought of as massive federated databases of health information which are able to easily "talk to each other." With this in mind, EMR has been seen as a necessary component to RHIO evolution due to the simple fact that EMR is how health care providers interact with the database.

The relevancy today of EMR and Billing Software is no longer the applications per se, but the data captured and transferred by those applications. There has also been a lot of discussion about health care records being owned by the patient. However, real "ownership" of the records will ultimately come in the form of the 10 cents per page stakeholders will pay each time they want copies of those records or to gain access to those records. In other words, what is really driving the private industry involvement in the Health Care Information Superhighway is an entirely new, realizable form of intangible property, namely access to the underlying data.

The Superhighway specifications at this juncture deal with medical data, such as lab work, prescriptions and medical encounters, for example. However, research indicates that the scope of the Superhighway will keep increasing, spiraling out to any form of data that touches or affects the health care system. It is expected that the Superhighway will further encompass reimbursement related data.

Not surprisingly, the Superhighway is unfolding in the form of multiple federated databases, as opposed to following a more centralized model. When it comes to federated systems, four major areas of concern appear to include: (1) data aggregation, (2) normalization, (3) federation, and (4) reconciliation. The migration of health care technology towards federated databases, and more particularly the need for data aggregation and normalization, seem to translate into the requirement(s) subscribers need to amass accurate, non-redundant data.

With this in mind, it has been found that in the healthcare industry, for example, there is a large problem of uncollected care. Major trends in the health care industry are affecting the ability of health care providers to get paid, grow their practices and minimize risk. Insurance deductibles are increasing. Coverage is declining. Benefits are becoming more complex. These and other trends are resulting in increased subject responsibility both directly and indirectly. For example, indirectly, the trends are having the effect of increasing subject responsibility by "clouding" the line between the insurance- and self-pay-portion. The net effect of these and other factor that would be evident to those possessing an ordinary skill in the art is increases in the amount of uncollected care.

By way of specific example, in 2006, uncollected care reached $3.9 Billion in the chiropractic industry. During this time, the chiropractic industry in the United States included approximately 30,000 chiropractic firms totaling approximately 40,000 actively practicing chiropractors with total revenues of $7 billion. During the same year, total chiropractic charges reached $10.9 billion, placing uncollected care at an estimated $3.9 billion or approximately 35% of the revenue.

While the discussion above centered in the chiropractic industry, this industry is not the only market that is experiencing uncollected costs—for example, the back pain industry is estimated at $44 billion annually with as much as $24.5 billion in uncollected care.

Therefore, a need exists to enable industries to collect uncollected costs. Further a need exists to present a solution that contains core components as separate, stand-alone system. The present invention provides such a method and system.

BRIEF SUMMARY OF THE INVENTION

An integrated payment system directed to the care of a subject and method of same is described herein. This system and method includes a care planner for accurately approximating the costs for the subject during the course of care, an insurance verifier and estimator that identifies the portion of the costs for the subject that is covered by the subjects insurance, wherein said approximated costs less the covered insurance leaves a subject payment, a discount planner that evaluates the application of at least one discount to the subject payment, and a payment planner that enables a payment arrangement for the subject for the subject payment less any applied discounts. Increased functionality of the payment system is achieved using automated integration of said care planner, said insurance verifier and estimator, said discount planner and said payment planner and providing the ability communicating in and among at least two of said care planner, said insurance verifier and estimator, said discount planner and said payment planner.

BRIEF DESCRIPTION OF THE DRAWINGS

Understanding of the present invention will be facilitated by consideration of the following detailed description of the embodiments of the present invention taken in conjunction with the accompanying drawings, in which like numerals refer to like parts and in which:

FIG. 1 is a block based systematic diagram of the payment system according to an aspect of the present invention;

DETAILED DESCRIPTION OF THE INVENTION

Figure 2:
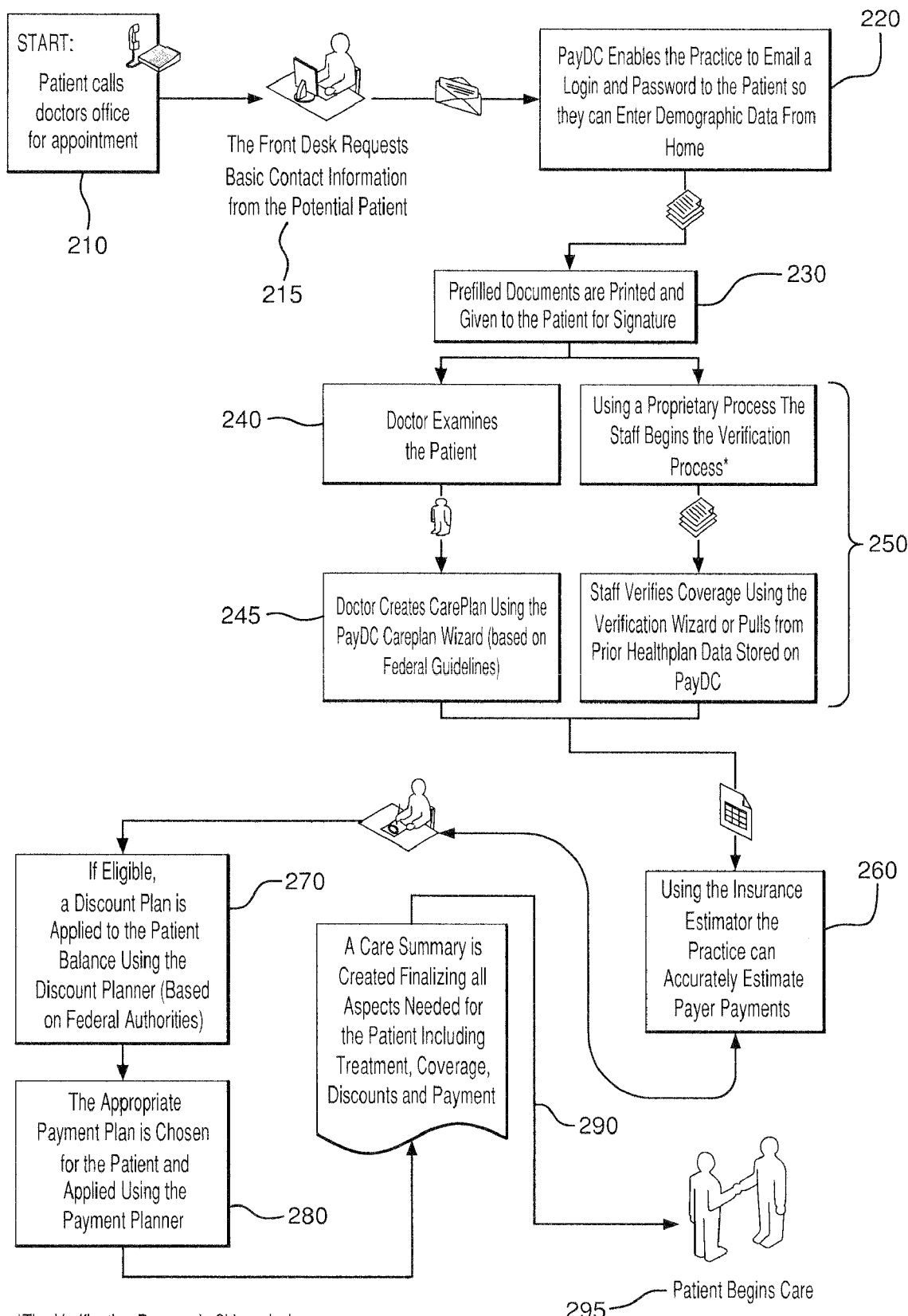
FIG. 2 is the methodology of the process of the payment system according to an aspect of the present invention.

It is to be understood that the figures and descriptions of the present invention have been simplified to illustrate elements that are relevant for a clear understanding of the present invention, while eliminating, for the purpose of clarity, many other elements found in billing software, electronic medical records software and payment systems. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

The present invention is directed toward maximizing the amount of collected costs and compliance. In particular, the system of the present invention is directed to maximizing the collection of currently uncollected costs. While the present invention may be used in any industry in which uncollected costs are an issue and more particularly to insurance covered industries, specific examples will be used herein throughout. For example, the chiropractic industry has total revenues of $7 billion with total chiropractic charges reached $10.9 billion, placing uncollected care at an estimated $3.9 billion or approximately 35% of the revenue. Collection of the uncollected market may be increased using the present invention. Specifically, it is believed that 45% of the chiropractic uncollected care market—or $1.7 billion—is collectable. This estimate is based on reported average collection rates of high- and low-volume practices as compared to the collection rates of more functional practices. It should be understood that the present payment system may be extended well beyond chiropractic care. The chiropractic industry provides an exemplary study to express numerical data of the problem and solution present in the industry and current invention. Other target arenas may include, without limitation, hospitals, as well as out-subject facilities that provide rehab, physical therapy, surgery, dentistry, speech therapy, and many other health care arenas. All aspects of veterinary care are also ideal for application of the present invention.

Subject as used herein may be a human, animal, pet or any other creature or entity to which a service may be provided.

Also the terms verification or confirmations may be made by any communicative mechanism as understood by those skilled in the art, including but not limited to online, picking up the phone and talking to a representative or subject, for any step involved.

Referring now to FIG. 1, there is shown a block based systematic diagram of the payment system according to an aspect of the present invention. As is shown in FIG. 1, the payment system may include a care planner 110, an insurance verifier 120, an insurance estimator 130, a discount planner 140, and a payment planner 150.

Care planner 110 may take the form of an automated customized care plan that may be easily and quickly created. Care planner 110 may also be a financially functional care plan. Care planner 110 may enable the user to accurately project the cost during a course of care. This financially functional care planner not only would enable a chiropractor, for example, to plan a course of care but would also enable the chiropractor to accurately project the cost of that course of care. This financially functional planning provides significantly more than the current medical documentation care plans in use today. Care planner 110 may produce a care plan that will require modification as other ailments or conditions of the subject would require. In the alternative, the current care plan may be left in place and a secondary care plan created by care planner 110 so as to have two discrete care plans for a given subject. In either case the costs associated with the modified, or additional care plans may be provided to the other portions of the payment system according to an aspect of the present invention. Such steps may also be taken for a third or future modified care plan or a subsequent discrete care plan for a subject, as necessary.

Insurance verifier 120 and insurance estimator 130 function together to identify the portion of costs of the care plan that the subjects insurance may pay, and thereby identify the portion that the subject may be responsible for. Verifier 120 and estimator 130 provide the care giver with the ability to collect information about the insurance of the subject, enter into the system, and provide the underlying basis and result of the estimate of the insurance payment. Such insurance verification and estimation may be made in a feedback controlled environment such that from within a given caregiver practice and for a certain insurance plan, the payment system may "learn" that treatment for a ear infection may result in insurance payments totaling a certain amount.

Figure 3:
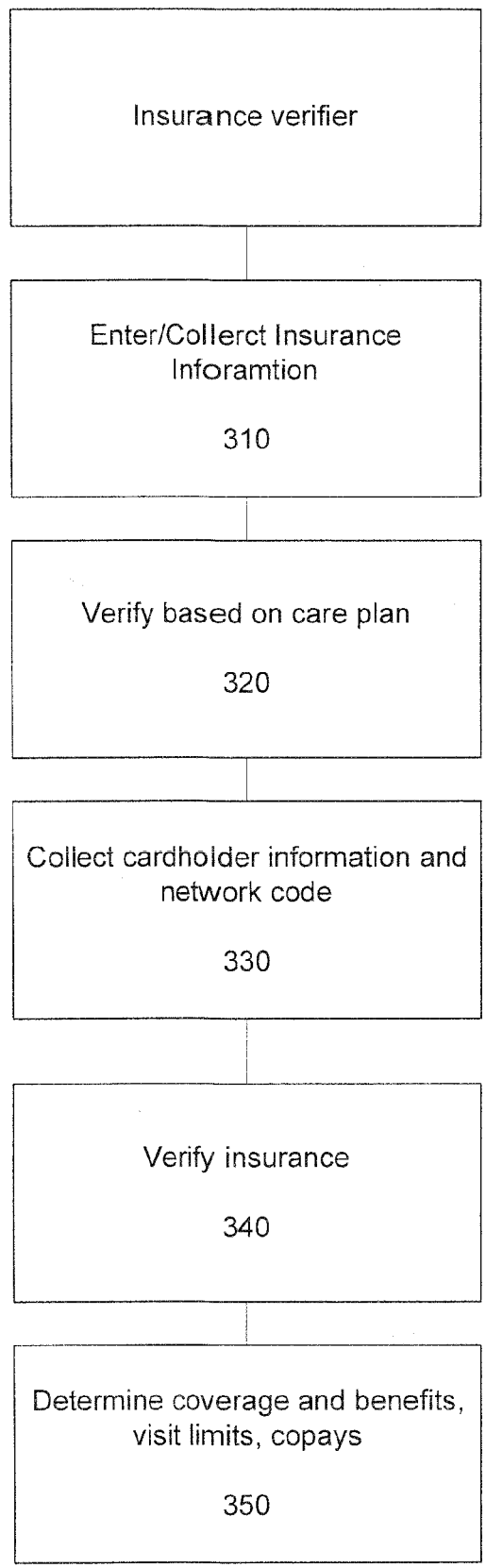
FIG. 3 is a block diagram of the aspects of the insurance verifier according to an aspect of the present invention.

Referring now also to FIG. 3, there is shown a block diagram of the aspects of the insurance verifier 120 according to an aspect of the present invention. As may be seen in FIG. 3, insurance verifier 120 may include entering or collecting insurance information 310 of the subject, verifying based on the care plan 320 set forth above, collecting cardholder information and network codes 330, confirming information 335, verifying insurance 340. Additionally, insurance verifier 120 may include determining coverage and benefits of health plan, visit limits, copays and other insurance information 350. Entering or collecting insurance information 310 of the subject may include determining information regarding the subject and payer and the details of each. This information may have already been inputted during the care planner portion and if so this action need not be repeated, but instead these variables may be passed to the insurance verifier 120. Verifying based on the care plan 320 set forth above may include verifying coverage based on the type of care that is determined to be administered under the care plan 110. For example, dentist visits may be covered at different rates than emergency care. This is such that dental coverage may not exist. Therefore verifying based on the care plan 320 may be necessary to determine that coverage exists for those services that are to be provided the subject under care plan 110 are those that are verified for coverage. Collecting cardholder information and network codes 330 may include collecting information based on the cardholder of the insurance. For example, certain subjects may carry insurance through another family member such as a kid through a parent for example. In such a situation, the information of the card holder may include the parent name, group and other information that would be evident to those possessing an ordinary skill in the pertinent art. All information may be confirmed 335. The insurance of the subject may then be verified 340. As part of the insurance verifier 120, according to an aspect of the present invention, determining coverage and benefits of health plan, visit limits, copays and other insurance information 350 may be performed.

Figure 4:
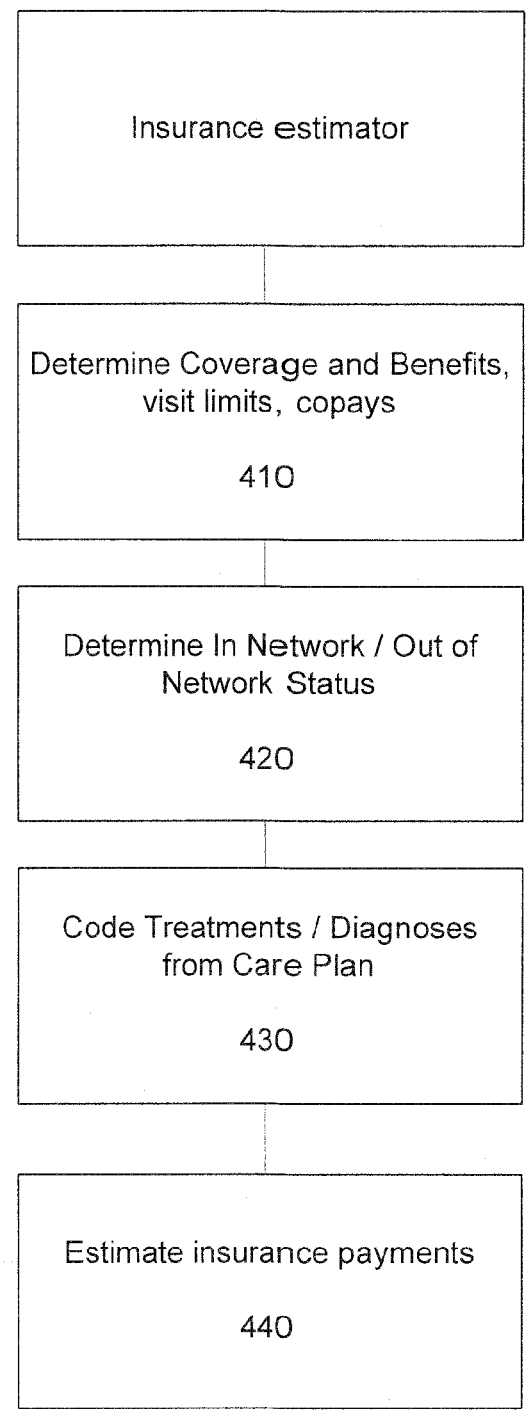
FIG. 4 is there is shown aspects of insurance estimator according to an aspect of the present invention; and, FIG. 5 is shown a discount planner incorporating a set of incorporated available discounts according to an aspect of the present invention.

Referring now also to FIG. 4, there is shown aspects of insurance estimator 130 according to an aspect of the present invention. As may be seen in FIG. 4, insurance estimator 130 may include determining coverage and benefits of health plan, visit limits, copays and other insurance information 410, determining the status of the service provider 420, coding treatments and diagnoses from care plan 110, and estimating insurance payments 440. As part of the insurance estimator 130, according to an aspect of the present invention, determining coverage and benefits of health plan, visit limits, copays and other insurance information 350 may be performed.

Determining the status of the service provider 420 may include determining the in-network/out-of-network status of the service provider, for example. As would be evident to those possessing an ordinary skill in the pertinent arts, an in-network doctor may be reimbursed differently than an out-of-network doctor. This factor therefore may be pivotal, although not necessary, to determining and estimating insurance payments for services. Coding treatments and diagnoses from care plan 110 may be needed to estimate with some accuracy the insurance payments. As would be evident to those possessing an ordinary skill in the pertinent arts, different codes and services rendered under care plan 110 may result in distinctly different reimbursement levels and rates. As such, determining the codes governing the services to be rendered by the provider may be influential in determining and estimating the insurance coverage for such services. In essence, knowing and understanding the services may aid in determining the reimbursement for those services.

From this, calculation(s) and knowing the overall course of care from the care planner above, the subject pay portion of the pay may also be provided. Specifically, the type of care identified in the care planner may be coded according to the subject's insurance. Once coded, the insurance payments may be identified as would be evident to those possessing an ordinary skill in the art. Further, a trade-off may be made by attempting to utilize a myriad of different and possibly distinct types of codes in order to maximize the amount of insurance coverage. For example, as dictated by ethics including the ethics of doctors and the requirements of insurance carriers and laws governing this area, the present system may be configured to provide coding recommendations using proper coding principles that may increase insurance coverage and those codes to the provider such that a more accurate care plan may be achieved. Key fee information and coding recommendations may be included.

Figure 5:
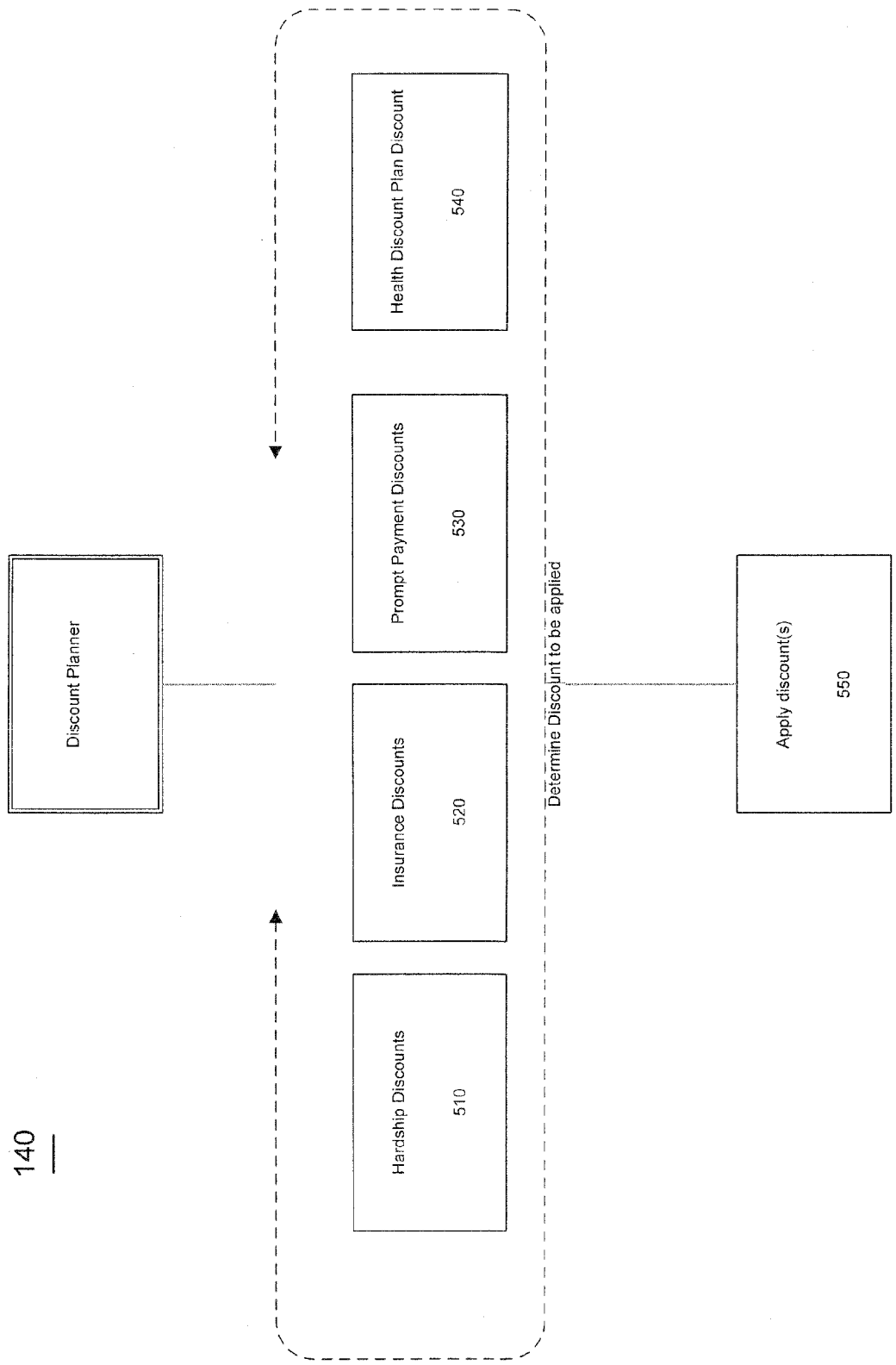

Discount planner 140 may include a myriad of discounts that may be available as may be evident to those possessing an ordinary skill in the pertinent arts. Discount planner 140 may apply discounts to the payments based on a myriad of factors. Further, the general field of discounting to incentivize behavior, such as entering a store, is well developed both from the perspective of advertising and the internet, for example. Any number and type of discounts may be used. In particular, by way of non-limiting example only, a four discount system may be utilized. Referring now also to FIG. 5, there is shown a discount planner 140 incorporating a set of incorporated available discounts according to an aspect of the present invention. As shown, there may be insurance discounts 520, hardship discounts 510, prompt payment discounts 530, and discounts 540 associated with any health discount plans which the provider may have joined. Some of the applied discounts may be required while others may be based on factors such as early payment, payment in full or other known methods designed to incentivize prompt and/or complete payments. As is well understood within the pertinent arts, incentives should not be designed in order to get treatment, but instead may be directed towards prompt or complete payments. Discount planner 140 may automate each of these four types of discounts and provide weighting and conditions for the application of each type of discount and applications of discounts as a whole. For example, the planner 140 may provide a required insurance discount 510, but by so doing rule out the application of a prompt payment discount 530. Insurance discounts 520 may include any discount which a provider is required to apply as a matter of law or contract. Generally, providers are prohibited from sending bills to the patient for the amount of a required insurance discount. Estimating the insurance discount can be more of an art than a science. The reason is that discovering the exact amount of required fee reductions in any given Insurance Plan scenario can be very challenging. According to an aspect of the present invention, a method is to use the Medicare Fee Schedule as the primary basis for approximating the amount of the overall discount by making the Medicare Fee Schedule the Primary Basis, and looking to see if a Medicare Fee Schedule amount has been associated with each procedure in the plan. If a Medicare Fee Schedule amount has been entered, the system then uses that amount when estimating the amount of the insurance discount. If no Medicare Fee Schedule amount is available for a particular procedure, the System automatically calculates a discount amount based on the instructions of the user.

Hardship discounts 510 may include waiver of deductibles and/or co-pays based on a poverty level and under insured analyses as well as other analyses. Specifically, hardship discounts 510 may be designed to assist uninsured and underinsured patients who are genuinely unable to afford their bills and cost-sharing amounts. Among other things, hardship discount 510 may be in writing, based on objective criteria, and uniformly applied. According to an aspect of the present invention, at least two independent hardship methodologies may be provided, including the poverty method and underinsured method. Once the hardship methods have been selected by the subject, they may be applied from that point forward until modified. Hardship discounts may be applied exclusively to the estimated patient portion after all other estimated discounts have been applied. Such waivers may raise compliance issues in certain cases and the proper analysis and application may be achieved according to an aspect of the present invention. Additionally, the potential salary, profession, net worth, or other known information about the subject may be used as an input in order to determine hardship discount 510 application. Prompt payment discounts 530 may include discounts designed to reduce a provider's accounts receivables and costs of debt collection. Among other things, the prompt payment discount should bear a reasonable relationship to the estimated amount of collection costs that would be avoided as a result of the discount. According to an aspect of the present invention, the prompt payment discount may be restricted and capped in various ways. Once the prompt payment discount settings are established, they may be applied to all subject payment plans from that point forward across the entire account until modified. For example, a 5 percent discount may be applied if the subject responsible portion is paid within the range of 1 day after service to 30 days after service and a 2 percent discount applied from 31 days after service to 45 days after service.

In offering prompt pay discounts there are several compliance and federal law issues to keep in mind. The system may offer to Medicare, Medicaid and other Federal health care program beneficiaries, along with all other insured patients, a discount for prompt payment of their cost-sharing amounts and amounts owed for non-covered services for which the patients received an advanced beneficiary notice. Such a prompt pay discount may be designed to reduce the accounts receivables and costs of debt collection, and to boost cash flow. The amount of fees discounted to patients may bear a reasonable relationship to the amount of collection costs that would be avoided. The prompt pay discount may be offered in connection with both in-patient and out-patient services and would be offered to insured patients regardless of financial status or ability to pay. Patients may benefit from the prompt pay discount in the following two exemplary circumstances: 1) when payments are made on a hospital bill prior to the discharge of the patient; or, 2) when payments are made after discharge, but within thirty (30) days of the patient's being informed of the discount offer. The size of the prompt pay discount may depend on both the timing of the payment and the size of the remaining balance owed by the patient. The prompt pay discount may be awarded according to the following schedule:

% of Bill Discounted on Payments Made Prior to Discharge

Balances $0-$999=10%

Balances≧$1,000=15%

% of Bill Discounted on Payments Made Post-Discharge—But Within 30 days of Discount Offer Balances $0-$999=5%

Balances≧$1,000=10%

The system may only notify patients of the prompt pay discount at certain times during the ordinary course of dealing with patients, such as when the patient registers for out-patient services and the patient pays his or her cost-sharing amount; when written statements are sent to a patient by mail; and when financial arrangements are made between the Health System and the patient, or his or her appointed financial counselor, after admission for inpatient health services. Disclosure of the prompt pay discount to third-party payers, and not claiming the waived amount as bad debt or otherwise shift the burden to the Medicare or Medicaid programs or other third party payers or individuals may increase compliance. Nor would the prompt pay discount be part of a price reduction agreement with third-party payers. The prompt pay discount may be offered without regard to the reason for the patient's admission, length of stay, diagnostic-related group, or ambulatory payment classification.

Other known and readily understood prompt payment discounts 530 may also be applied. Discounts 540 associated with any health discount plans which the provider may have joined may include plans that enroll individuals or families and contract to provide services on a discounted basis to enrolled members, provided that the enrolled member uses one of the contracted providers for a service covered by the plan. Such discounts may vary by the type of plan, provider, enrollee, and the type of service received.

Payment planner 150 may take the care planner expected costs, the developed insurance payment portion, and after accounting for appropriately applied discounts develop a form of payment plan based on the balance for the subject. Sample payment arrangements may include pre-payment, time-of-service, and installment payment plans. Such plans may be coordinated with or without monthly auto-debit transactions.

The payment system of the present invention including care planner 110, insurance verifier 120, insurance estimator 130, discount planner 140, and payment planner 150 provide increased functionality based on the integration of these pieces. In particular, each of these portions communicate with the other portions in that there is a feeding of information from one portion to the others and enhances the next step in the system. For example, the care planner 110 feeds information to the verifier 120 and estimator 130 so that each of these modules may individually perform their respective actions in verifying insurance and estimating the payment in the implementation of the care plan provided by care planner 110.

Referring now additionally to FIG. 2, there is shown the methodology of the process of the payment system according to an aspect of the present invention. As may be seen in FIG. 2, the process of the present invention may include a subject calling an office for service 210, requesting basic information from the subject 215, enabling the office to remotely send connection information to the subject to enable the subject to enter data remotely 220, pre-filling documents and providing to subject 230, care provider examines subject 240, care provider creates care plan using care plan wizard 245, verifying insurance 250, estimating insurance 260, providing a discount plan 270, choosing and applying payment plan 280, summarizing care plan 290, and beginning care 295.

The system of the present invention may be configured using a desktop software application or a web based application. Additionally, a combination of desktop and web based applications may be used. This combination approach may be referred to as a smart client approach. Such a smart client approach may draw from the positives found individually in web based and desktop applications while avoiding the downsides found individually in web based and desktop applications. For example, the desktop component may enhance the speed while providing rich graphical user-interface capacity. The web component may enable users to have more flexible access to the underlying data and software upgrades. By utilizing a smart client approach these features may be tapped in the overall system instead of limiting to one set of good attributes or the other.

Further, the system as described herein may be used and accessed by any computing device, such as a desktop or laptop, tablet, phone, pager or any other fixed or mobile device suitable for running the described system. Further, the present system may be used and designed for use on a local area network, wireless network, or internet. Data may be contained in a single database or may be dispersed through any number of databases. Connections in and among those databases may be made as would be evident to those possessing an ordinary skill in the pertinent arts.

Users of the present payment system may have the ability to electronically generate the documents and forms necessary for increasing their collections rates. Users may also be provided the ability to print documents, or alternatively email them to subjects for either online completion or printing-then-manual completion. These forms may save further time for users by enabling information to be typed directly into the present payment system.

Administrative time may also be saved by archiving and retrieving care plans, payment plans, and health insurance plans and information. Configured plans may be used as starting points based on the coding that was used. Configured plans may also be used as starting points based on the same subject. The present system may enable users to store such information in their system for later use and retrieval, thereby saving the practice significant administrative time.

The present payment system may be built on top of a platform which will enable it to easily scale and expand over time.

The present payment system may also include as a design feature a design to eliminate the data "silo" issue. As would be evident to those possessing an ordinary skill in the arts, a data "silo" issue is a problem which so many other software developers in health care fail to address. By way of illustration, the database is being designed to enable entities, which get input into the system, to be associated with different "hats" or roles. Such a configuration often will result in the loss of database integrity. By modeling the present payment system, this loss of database integrity may be reduced or even eliminated.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A computer integrated payment system directed to the care of a subject, said system comprising:
    a care planner, accessed via a computing device, for accurately approximating the costs for the subject during the course of care;
    an insurance verifier and estimator, accessed via a computing device, that identifies the portion of the costs for the course of care of the subject that is covered by the subject's insurance, wherein said approximated costs less the covered insurance leaves a subject payment;
    a discount planner, accessed via a computing device, that evaluates the application of at least one discount to the subject payment, wherein the at least one discount includes a prompt payment discount; and,
    a payment planner, accessed via a computing device, that enables a payment arrangement for the subject for the subject payment less any applied discounts,
    wherein increased functionality of the computer integrated payment system is achieved using automated integration of said care planner, said insurance verifier and estimator, said discount planner and said payment planner and providing the ability to communicate in and among at least two of said care planner, said insurance verifier and estimator, said discount planner and said payment planner,
    wherein, when prior to the subject being discharged from the course of care, said prompt payment discount is determined to be 10% when a balance of the subject payment is less than $1000.00, and 15% when the balance of the subject payment is equal to or greater than $1000.00; and
    when after discharge of the subject from the course of care, but within 30 days of said prompt payment discount being offered, said prompt payment discount is determined to be 5% when the balance of the subject payment is less than $1000.00, and 10% when the balance of the subject payment is equal to or greater than $1000.00.

2. The integrated payment system of claim 1, wherein the verifier and estimator provides the ability to collect information about the insurance of the subject, enter the collected information into the system, and provide the underlying basis and result of the estimate of the insurance payment.

3. The integrated payment system of claim 2, wherein the verifier and estimator operate in a feedback controlled environment.

4. The integrated payment system of claim 1, wherein the verifier includes entering or collecting insurance information of the subject.

5. The integrated payment system of claim 4, wherein entering or collecting insurance information of the subject includes determining information regarding the subject and payer and the details of each.

6. The integrated payment system of claim 1, wherein the verifier includes verifying insurance based on the care plan.

7. The integrated payment system of claim 1, wherein the verifier includes collecting cardholder information regarding the subject's insurance.

8. The integrated payment system of claim 1, wherein the verifier includes determining at least one of coverage and benefits of health plan, visit limits, copays and other insurance information.

9. The integrated payment system of claim 1, wherein the verifier includes verifying coverage based on the type of care that is determined to be administered under the care plan.

10. The integrated payment system of claim 1, wherein the estimator includes determining the status of the service provider.

11. The integrated payment system of claim 10, wherein determining the status of the service provider includes determining the in-network/out-of-network status of the service provider.

12. The integrated payment system of claim 1, wherein the estimator includes coding treatments and diagnoses from the care plan.

13. The integrated payment system of claim 1, wherein the estimator includes providing coding recommendations using proper coding principles that increase insurance coverage.

14. The integrated payment system of claim 1, wherein the discount planner that evaluates the application of at least one discount to the subject payment applies said at least one discount to the payments based on a myriad of factors.

15. The integrated payment system of claim 1, wherein the discount planner further includes at least one of insurance discounts, hardship discounts, and discounts associated with any health discount plans.

16. The integrated payment system of claim 15, wherein the discount planner automates application of each applied discount and provides weighting and conditions for the application of each type of discount and applications of discounts as a whole.

17. The integrated payment system of claim 15, wherein insurance discounts include any discount which a provider is required to apply as a matter of law or contract.

18. The integrated payment system of claim 15, wherein hardship discounts include waiver of deductibles and co-pays.

19. The integrated payment system of claim 15, wherein said waiver of deductibles and co-pays is based on one of poverty level and under insured analyses.

20. The integrated payment system of claim 15, wherein said hardship discounts are designed to assist uninsured and underinsured patients that are unable to afford bills and cost-sharing amounts.

21. The integrated payment system of claim 15, wherein said hardship discounts are in writing, based on objective criteria, and uniformly applied.

22. The integrated payment system of claim 1, wherein said prompt payment discounts include discounts designed to reduce a provider's accounts receivables and costs of debt collection.

23. The integrated payment system of claim 1, wherein the payment planner takes the care planner expected costs, the developed insurance payment portion, and after accounting for appropriately applied discounts develops a form of payment plan based on the balance for the subject.

24. The integrated payment system of claim 1, wherein the payment planner includes sample payment arrangements based on pre-payment, time-of-service, and installment payment plans.

25. The integrated payment system of claim 1, wherein the payment planner includes plans coordinated with monthly auto-debit transactions.

26. The integrated payment system of claim 1, wherein the payment planner includes plans coordinated without monthly auto-debit transactions.

27. A method of achieving computer integrated payment system directed to the care of a subject, said method comprising the steps of:

requesting contact information of the subject;

enabling the subject and a provider to enter information into the system via a computing device, said information including at least one demographic data of the subject;

prefilling at least one document within the payment system via a computing device;

verifying the insurance of said subject via a computing device;

developing a care plan for said subject via a computing device;

estimating the insurance payment for the developed care plan of said subject via a computing device;

applying at least one discount via a computing device to the payment for the developed care plan of said payment, wherein the at least one discount includes a prompt payment discount; and, determining an appropriate payment plan via a computing device for the cost of the developed care plan reduced by said estimated insurance payment and said applied at least one discount, wherein, when prior to the subject being discharged from the course of care, said prompt payment discount is determined to be 10% when a balance of the payment is less than $1000.00, and 15% when the balance of the payment is equal to or greater than $1000.00; and when after discharge of the subject from the course of care, but within 30 days of said prompt payment discount being offered, said prompt payment discount is determined to be 5% when the balance of the payment is less than $1000.00, and 10% when the balance of the payment is equal to or greater than $1000.00.

* * * * *